United States Patent
Kawamura et al.

(10) Patent No.: US 9,765,821 B2
(45) Date of Patent: Sep. 19, 2017

(54) ROLLING BEARING

(71) Applicant: NTN CORPORATION, Osaka (JP)

(72) Inventors: Takayuki Kawamura, Mie (JP); Motohiro Ito, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/905,948

(22) PCT Filed: Jul. 18, 2014

(86) PCT No.: PCT/JP2014/069189
§ 371 (c)(1),
(2) Date: Jan. 18, 2016

(87) PCT Pub. No.: WO2015/008856
PCT Pub. Date: Jan. 22, 2015

(65) Prior Publication Data
US 2016/0160923 A1 Jun. 9, 2016

(30) Foreign Application Priority Data

Jul. 19, 2013 (JP) .................................. 2013-150449
Jan. 10, 2014 (JP) .................................. 2014-002932

(51) Int. Cl.
*C10M 169/04* (2006.01)
*C10M 173/00* (2006.01)
(Continued)

(52) U.S. Cl.
CPC ....... *F16C 33/6633* (2013.01); *C10M 105/04* (2013.01); *C10M 105/18* (2013.01);
(Continued)

(58) Field of Classification Search
CPC ...... C10N 2220/022; C10M 2215/042; C10M 2215/102
(Continued)

(56) References Cited

U.S. PATENT DOCUMENTS

2009/0279824 A1* 11/2009 Mikami ............... C10M 169/00
384/462

FOREIGN PATENT DOCUMENTS

GB 719982 A * 12/1954 .............. C10M 5/00
JP 03-210394 A 9/1991
(Continued)

OTHER PUBLICATIONS

International Search Report dated Oct. 21, 2014.

*Primary Examiner* — Vishal Vasisth
(74) *Attorney, Agent, or Firm* — Hedman & Costigan, P.C.; James V. Costigan; Kathleen A. Costigan

(57) ABSTRACT

A rolling bearing that can prevent peeling on a surface of an iron-based metal member by hydrogen brittleness even under a severe environment is provided. The rolling bearing 1 has plural bearing elements formed of an iron-based metal, and a lubricant composition 7 that lubricates metal contact surfaces of the respective bearing elements, the lubricant composition 7 is a grease containing a base oil and alkanolamine and being free of alkali metal salts and alkaline earth metal salts of inorganic acids, the base oil is at least one oil selected from alkyl diphenyl ether oils, poly-α-olefin oils and ester oils, and the alkanolamine is contained by 0.1 to 10 parts by weight with respect to 100 parts by weight of the total amount of the base oil and a thickener.

4 Claims, 7 Drawing Sheets

(51) Int. Cl.
*C10M 115/08* (2006.01)
*F16C 33/76* (2006.01)
*F16C 33/66* (2006.01)
*C10M 105/04* (2006.01)
*C10M 105/18* (2006.01)
*C10M 105/32* (2006.01)
*C10M 133/08* (2006.01)
*F16C 19/06* (2006.01)

(52) U.S. Cl.
CPC ........ *C10M 105/32* (2013.01); *C10M 115/08* (2013.01); *C10M 133/08* (2013.01); *C10M 169/04* (2013.01); *C10M 2203/1006* (2013.01); *C10M 2205/0285* (2013.01); *C10M 2207/0406* (2013.01); *C10M 2207/2805* (2013.01); *C10M 2215/042* (2013.01); *C10M 2215/064* (2013.01); *C10M 2215/1026* (2013.01); *C10M 2223/045* (2013.01); *C10N 2220/022* (2013.01); *C10N 2230/06* (2013.01); *C10N 2230/40* (2013.01); *C10N 2240/02* (2013.01); *C10N 2250/10* (2013.01); *F16C 19/06* (2013.01); *F16C 2360/46* (2013.01); *F16C 2361/61* (2013.01); *F16C 2361/63* (2013.01); *F16C 2380/26* (2013.01)

(58) Field of Classification Search
USPC .......................... 508/110, 530, 552; 384/484
See application file for complete search history.

(56) References Cited

FOREIGN PATENT DOCUMENTS

| | | |
|---|---|---|
| JP | 11-279578 A | 10/1999 |
| JP | 2005-042102 A | 2/2005 |
| JP | 2005-298537 A | 10/2005 |
| JP | 2006-306986 A | 11/2006 |
| JP | 2008-156624 A | 7/2008 |
| JP | 2008-266424 A | 11/2008 |
| JP | 2011-168648 A | 9/2011 |
| JP | 2012-017460 A | 1/2012 |
| JP | 2013-018973 A | 1/2013 |
| JP | 2013-082882 A | 5/2013 |
| WO | 2011/101348 A1 | 8/2011 |
| WO | 2011/155513 A1 | 12/2011 |

\* cited by examiner

ROLLING BEARING

This application is a 371 of PCT/JP2014/069189, filed Jul. 18, 2014.

TECHNICAL FIELD

The present invention relates to a rolling bearing. Specifically, the present invention relates to (1) a rolling bearing for use in electrical components/auxiliary machines for automobiles such as an alternator, an electromagnetic clutch for automobile air conditioners, a fan coupling device, an intermediate pulley and an electric fan motor, (grease lubrication), (2) a rolling bearing for use in motors of industrial mechanics, for driving electric automobiles and the like (grease lubrication), (3) a rolling bearing for use in machine tools (grease lubrication), (4) a rolling bearing for use in speed-up gears for wind-power generation devices and the like, and reducers for construction machines (oil lubrication), and the like.

BACKGROUND ART

In recent years, in accordance with requirements for the miniaturization, weight saving, and improvement of calmness of automobiles, efforts have been made for miniaturization, weight saving, and tight-sealability in engine rooms of electrical components and auxiliary machine parts thereof. On the other hand, the requirements of high output and high efficiency have been increased for the performances of the devices, and in electrical components and an auxiliary machine in an engine room, a means for making up for the decrease in the output that arises in accordance with miniaturization by rotating at a high-speed is adopted. As examples of the rolling bearing for electrical components/auxiliary machines for automobiles, general description will be given below of a rolling bearing for fan coupling devices, a rolling bearing for automobile alternators, and a rolling bearing for idler pulleys.

A fan coupling device for automobiles is a device provided with a housing including a viscous fluid enclosed therein and a blast fan attached to the outer periphery surface and with a rotor that is directly linked to an engine. In this device, the housing is connected to the engine via a bearing, which performs optimal blasting corresponding to the temperature of the engine by controlling the driving torque transmission amount from the engine and the rotation number of the fan by utilizing the shear resistance of the viscous fluid which increases or decreases in response to the atmospheric temperature. Therefore, a rolling bearing for fan coupling devices requires durability by which the rolling bearing can withstand extremely severe environments such as unevenness of rotation such that the rotation number varies from 1,000 rpm to 10,000 rpm in accordance with the variation of the engine temperature, and high-speed rotation at 10,000 rpm or more under a high temperature of 180° C. or more during high-speed operation in summer.

An alternator for automobiles has functions to generate electrical power by receiving the rotation of an engine with a belt to thereby supply an electrical power to an electrical load of a vehicle, and to charge a battery. Furthermore, an idler pulley for automobiles is used as a belt tensioner for a driving belt that transmits the rotation of an engine to an auxiliary machine of an automobile, and has a function as a pulley for providing tension force as a tensioner to a belt in the case when the distance between axes is fixed, and a function as an idler that is used for changing the running direction of the belt or for avoiding obstacles to thereby decrease the inner volume of an engine room. The alternator for automobiles and the idler pulley for automobiles also require durability by which the alternator or idler pulley can withstand an extremely severe environment of high-speed rotation at 10,000 rpm or more under a high temperature of 180° C. or more.

For the lubrication of the rolling bearings thereof, a grease is mainly used. However, when the conditions for use become severe, such as rapid acceleration and deceleration, high temperature and high-speed rotation, specific peeling associated with white tissue change may occur on a rolling surface of a rolling bearing at an early stage. This specific peeling is considered to be hydrogen brittleness, which is a breaking phenomenon generated from a relatively shallow part on the surface of a rolling surface, and is caused by hydrogen generated by the decomposition of the grease, and the like, unlike peeling from the inside of a rolling surface generally caused by metal fatigue. For example, it is considered that peeling at an early stage due to hydrogen brittleness is caused by the fact that the grease is decomposed to generate hydrogen, and the hydrogen enters the steel of a rolling bearing.

Since hydrogen significantly decreases the fatigue strength of steel, even under a condition in which contacting elements are lubricated by elastic fluid lubrication in which the elements are separated by an oil film, cracks generate around the interior of a rolling surface layer at which an alternating shear stress becomes the largest, and the cracks transmit to lead peeling at an early stage. Furthermore, it is considered that, when used under a condition in which water is mixed with the grease, under a condition associated with slipping, under a condition in which energization occurs, or the like, the water or grease is decomposed to lead easy generation of hydrogen, and the hydrogen enters the steel, whereby the above-mentioned peeling at an early stage due to hydrogen brittleness easily occurs.

In the above-mentioned bearings that are used in electrical components and auxiliary machines in automobiles, and also in bearings that support main axes of machine tools, motors in industrial machines, motors for driving electric automobiles and hybrid automobiles, and the like, a grease is mainly used for the lubrication thereof, but the condition of use thereof have been stricter year by year, since miniaturization, high performances and high outputs have been required. Accordingly, similar specific peeling is a problem also in rolling bearings used in these. Furthermore, this specific peeling has become obvious also in rolling bearings for use in oil lubrication such as rolling bearings for use in reducers for construction machines and speed-up gears for wind-power generation devices.

As methods for suppressing such specific peeling associated with white tissue change which generates at an early stage, for example, a method in which a passivator is added to a grease (see Patent Document 1) and a method in which bismuth dithiocarbamate is added (see Patent Document 2) are proposed. Furthermore, since a bearing rolling surface is constituted by a bearing steel of an iron-based metal, a method in which a metal powder of aluminum, silicon, titanium, tungsten, molybdenum, chromium, cobalt or the like is incorporated in a grease composition with consideration for the mutual solubility with iron is also suggested (see Patent Document 3).

Furthermore, in grease compositions that have been conventionally used for rolling bearings, a grease composition containing alkanolamine derivative modified with a hydrophilic group as a hydrophilic organic inhibitor is known (see Patent Document 4). This alkanolamine derivative is a salt of a dibasic acid such as dodecanoic acid or sebacic acid, an acid such as boric acid, and alkanolamine such as diethanolamine, aminotetrazole or diethylaminoethanol.

In addition, as a lubricant composition that is excellent in heat-resistance, mechanical stability, water resistance, rust resistance, loading resistance, flame retardancy and the like, a lubricant composition containing a base oil formed of mineral oils and synthetic oils, tricalcium phosphate, and a grease structure stabilizer such as diethanolamines is proposed (see Patent Document 5).

PRIOR ART DOCUMENT

Patent Documents

Patent Document 1: JP 03-210394 A
Patent Document 2: JP 2005-42102 A
Patent Document 3: JP 2008-266424 A
Patent Document 4: JP 11-279578 A
Patent Document 5: JP 2008-156624 A

SUMMARY OF THE INVENTION

Problems to be Solved by the Invention

However, in electrical components and auxiliary machines in automobiles, motors in industrial machines, and the like, further miniaturization of bearings is promoted in accordance with the miniaturization in recent years. Therefore, the contact surface pressure loaded on elements constituting a bearing tends to increase. Furthermore, acceleration of the rotation speeds of these devices is also promoted, and thus a high-speed operation—a rapid deceleration operation—a rapid acceleration operation—sudden stopping tend to be frequently performed. Specifically, in electrical components and auxiliary machines in automobiles, the frequency of rapid acceleration and deceleration tends to increase in accordance with high functionality such as idling stop. Raising of a surface pressure between a rolling body and a bearing ring, and increase of slipping due to rapid acceleration and deceleration easily cause oil film shortage (lubrication defect) at that part. Under such severe environments, conventional methods in which a passivator or bismuth dithiocarbamate is added as in Patent Documents 1 and 2 are insufficient as the countermeasures for preventing the above-mentioned peeling phenomenon.

With respect to construction machines, those used for construction operations in colder or higher-heat environments than before tend to increase in the future. Furthermore, with respect to wind-power generation devices, it is considered that cases in which the devices are installed on the seas, mountainous regions (highlands) and the like, which were not positively-considered sites before, will increase from the viewpoints of the decrease in freeness of places for installation associated with further increase of the needs in the future, the trend of changeover of energy, and the progress of wind condition analysis. Due to these circumstances, prevention of the above-mentioned peeling phenomenon is desired even under use environments which are severer than anticipated before. Specifically, it is expected that the access to the device also becomes difficult, and thus it is considered that the needs for preventing the above-mentioned peeling phenomenon for a long term and decreasing the frequency of maintenance are also increased.

The thinner an oil film on a bearing sliding surface is, the more easily the above-mentioned peeling phenomenon occurs. Specifically, under the above-mentioned severe environments and the like, the lubrication on the sliding surface is under a border lubrication condition, and the oil film thickness is on the order of submicrons (0.1 μm or less). Under such environments, for example, even in the case when a metal powder having mutual solubility with iron of a predetermined degree or more is used as in Patent Document 3, the metal powder cannot sufficiently intervene in the sliding surface, and the effect may not be obtained depending on the particle diameter thereof and the like.

There is a grease composition in which alkanolamine salt is incorporated in a conventional grease composition for rolling bearings as in Patent Document 4, but the ability of preventing the above-mentioned peeling phenomenon by a single form of alkanolamine has not been considered. Furthermore, the ability of preventing the above-mentioned peeling phenomenon has not been considered also in the grease composition described in Patent Document 5, and there are some cases in which an adverse effect is rather given depending on the specific combination of the essential components. Furthermore, in the case when a rolling bearing is used under a high temperature condition, it is necessary to maintain excellent high temperature durability, simultaneously with prevention of the above-mentioned peeling phenomenon.

Furthermore, when water enters the bearing in the above-mentioned various applications, the above-mentioned peeling phenomenon easily occurs, and rust may generate in the bearing.

The present invention was made to solve such problems, and aims at providing a rolling bearing that can prevent peeling on a surface of an iron-based metal member due to hydrogen brittleness even under severe environments.

Means for Solving the Problem

The rolling bearing of the present invention is a rolling bearing including a plurality of bearing elements formed of an iron-based metal, and a lubricant composition that lubricates the metal contact surfaces of the respective bearing elements. In this bearing, the lubricant composition is a lubricating oil or a grease containing a base oil and alkanolamine and being free of alkali metal salts and alkaline earth metal salts of inorganic acids. In the case of the lubricating oil, the base oil is at least one oil selected from mineral oils, highly-purified mineral oils and water-soluble lubricating oils; and in the case of the grease, the base oil is at least one oil selected from alkyl diphenyl ether oils, poly-α-olefin oils (hereinafter also referred to as "PAOs") and ester oils. In the case of the lubricating oil, the alkanolamine is contained by 0.1 to 10% by weight with respect to the entirety of the lubricating oil; and in the case of the grease, the alkanolamine is contained by 0.1 to 10 parts by weight with respect to 100 parts by weight of the total amount of the base oil and a thickener.

The above-mentioned alkanolamine is dialkanolamine or trialkanolamine. Specifically, the above-mentioned alkanolamine is diethanolamine.

The lubricant composition is the grease, and the thickener of the grease contains at least one urea compound selected from aliphatic diurea compounds, alicyclic diurea compounds and aromatic diurea compounds.

The lubricant composition is the grease, and the grease contains zinc dithiophosphate and an amine-based antioxidant.

The above-mentioned rolling bearing is a bearing for an electrical component/an auxiliary machine for automobiles which is configured to rotatably support a rotation axis that is rotation-driven in an engine output on a static element, and the lubricant composition is the grease. Furthermore, in this use, the above-mentioned base oil is (A) an oil containing, as an essential component, an alkyl diphenyl ether oil by 25% by weight or more with respect to the entirety of the base oil, or (B) an oil containing, as an essential component, an ester oil by 25% by weight or more with respect to the entirety of the base oil. Furthermore, in this case, the base oil contains PAO. Furthermore, in this case, the thickener is an alicyclic diurea compound.

Effect of the Invention

Since the rolling bearing of the present invention contains a plurality of bearing elements formed of an iron-based metal, and a lubricant composition that lubricates the metal contact surfaces of the respective bearing elements, and the lubrication composition is a predetermined composition containing a predetermined base oil and a predetermined alkanolamine, peeling on a rolling surface and the like due to hydrogen brittleness can be effectively prevented even in the case when an oil film becomes thin under a severe condition. Consequently, the rolling bearing has an excellent bearing lifetime, and thus can be preferably utilized as a rolling bearing for electrical components and auxiliary machines for automobiles such as alternators, electromagnetic clutches for automobile air conditioners, fan coupling devices, intermediate pulleys and electric fan motors. Furthermore, the rolling bearing can be preferably utilized as a rolling bearing for machine tools. In addition, the rolling bearing can be preferably utilized as a bearing for use in oil lubrication such as bearings for use in reducers for construction machines and in speed-up gears for wind-power generation devices.

MODE FOR CARRYING OUT THE INVENTION

Figure 1:
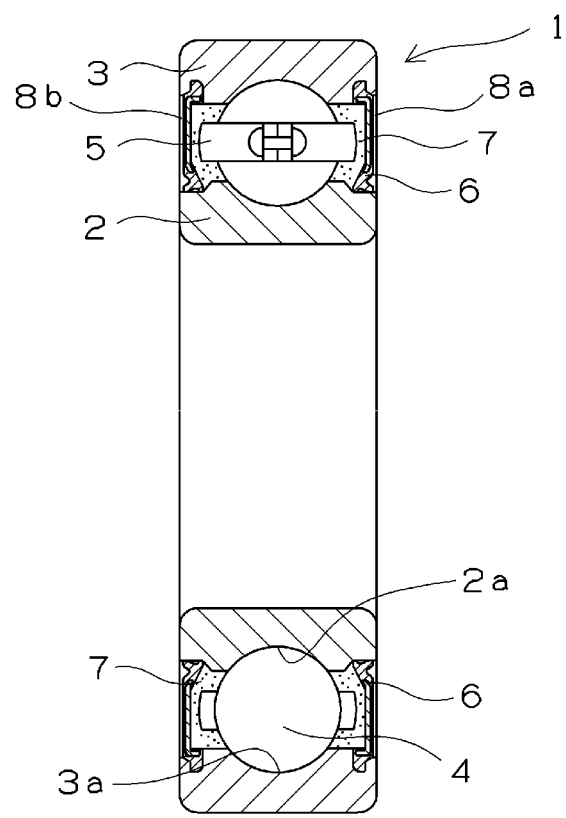
FIG. 1 is a cross-sectional view of a deep groove ball bearing, which is an example of the rolling bearing of the present invention.

In order to prevent peeling on a rolling surface (a surface of an iron-based metal member) due to hydrogen brittleness in a rolling bearing, the inventors did intensive studies on lubricating oils or greases to be provided to lubrication, and consequently found that peeling on a rolling surface due to hydrogen brittleness can be effectively prevented by incorporating alkanolamine as an essential additive in a predetermined base oil.

In the case when two iron-based metal members, such as a rolling body and a bearing ring, a rolling body and a cage, or the like roll while contacting with a lubricating oil or a grease, and are brought into a contact and sliding state in a rolling bearing, there are some cases in which an oil film is almost lost on the contact surface of the iron-based metal members, and thus the iron-based metal members are put into a border lubrication condition, i.e. a state in which the surfaces of the metals are partially brought into direct contact. In rolling bearings for electrical components and auxiliary machines for automobiles, and the like in recent years, as mentioned above, oil film shortage easily occurs due to increase in a surface pressure between a rolling body and a bearing ring, and increase of slipping due to rapid acceleration and deceleration. Even in such a case when an oil film is thin under a severe condition (a border lubrication condition) on a sliding surface as mentioned above, the direct contact of a newly-generated surface of an iron-based metal and a lubricating oil or a grease can be prevented by adsorption or the like of alkanolamine on the abrasion-worn surface on the contact part or the newly generated surface of the iron-based metal which has been exposed by wearing. It is considered that the generation of hydrogen due to the decomposition of the lubricating oil or grease can be suppressed in this way to thereby prevent specific peeling due to hydrogen brittleness, and thus the lifetime of the rolling bearing can be extended. The present invention is based on these findings, and can be preferably used for lubrication, specifically for lubrication in which an environment under which an iron-based metal member and a lubricating oil or a grease is brought into contact with each other is a lubrication condition of the surface of the iron-based metal member surface in a rolling bearing.

The embodiments of the lubricant composition used for the rolling bearing of the present invention includes two kinds: (1) a lubricating oil containing a predetermined base oil and a predetermined alkanolamine as essential constitutions, and (2) a grease containing a predetermined base oil, a predetermined thickener and a predetermined alkanolamine as essential constitutions. Furthermore, in either of these cases, alkali metal salts of inorganic acids and alkaline earth metal salts of inorganic acids are not contained. Examples of the inorganic acids herein include phosphoric acid (orthophosphoric acid), hydrochloric acid, nitric acid, sulfuric acid, boric acid and the like, and examples of the alkali metals and alkaline earth metals include lithium, sodium, potassium, calcium, strontium, barium and the like. Specific examples include calcium triphosphate (a calcium salt of orthophosphoric acid) and the like.

Examples of the alkanolamine used in the present invention include primary alkanolamines such as monoisopropanolamine, monoethanolamine and mono-n-propanolamine, secondary alkanolamines such as N-alkylmonoethanolamine and N-alkylmonopropanolamine, and tertiary alkanolamines such as triethanolamine, cyclohexyldiethanolamine, tri(n-propanol)amine, triisopropanolamine, N,N-dialkylethanolamine and N-alkyl (or alkenyl)diethanolamine. Furthermore, the alkanolamines are classified into monoalkanolamines, dialkanolamine and trialkanolamines depending on the number of the alkanol group(s). It is preferable to use a dialkanolamine or a trialkanolamine in the present invention, since iron ion is present in between to thereby easily prevent the exposure of the newly generated surface of the iron-based metal by the chelate action of the plural hydroxyl groups (alkanol groups) and the amino group.

Among the above-mentioned alkanolamines, it is preferable to use an N-alkyl (or alkenyl) diethanolamine of the following formula (1), since it is excellent in compatibility with the base oil and ability to prevent peeling phenomenon, and also excellent in availability.

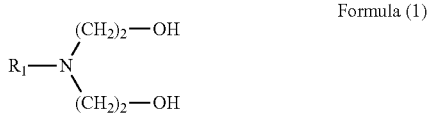

Formula (1)

$R_1$ in the formula represents a straight chain or branched alkyl group or alkenyl group having 1 to 20 carbon atom(s). Furthermore, the number of the carbon atom(s) is preferably from 1 to 12, more preferably from 1 to 8. Examples of the specific compounds include N-methyldiethanolamine, N-ethyldiethanolamine, N-propyldiethanolamine, N-butyldiethanolamine, N-pentyldiethanolamine, N-hexyldiethanolamine, N-heptyldiethanolamine, N-octyldiethanolamine, N-nonyldiethanolamine, N-decyldiethanolamine, N-undecyldiethanolamine, N-lauryldiethanolamine, N-tridecyldiethanolamine, N-myristyldiethanolamine, N-pentadecyldiethanolamine, N-palmityldiethanolamine, N-heptadecyldiethanolamine, N-oleyldiethanolamine, N-stearyldiethanolamine, N-isostearyldiethanolamine, N-nonadecyldiethanolamine, N-eicosyldiethanolamine and the like.

One kind of the alkanolamine may be used singly, or two or more kinds of the alkanolamines may be used in combination. Alternatively, the alkanolamine is preferably alkanolamine that is a liquid or paste form at room temperature and use temperature. Alternatively, the alkanolamine may be in a state in which it is dispersed in a solvent, a mineral oil or the like. By using such alkanolamine, even in the case when the oil film at a sliding part is thinned under a severe condition, the alkanolamine easily enters the sliding part. The kinetic viscosity of the alkanolamine is preferably from 10 to 100 mm$^2$/s at 40° C., more preferably from 40 to 70 mm$^2$/s at 40° C.

Examples of commercial products of the alkanolamine (tertiary diethanolamine) include Adeka Kiku-Lube FM-812 and Adeka Kiku-Lube FM-832 manufactured by ADEKA Corporation, and the like.

In the case when the above-mentioned lubricant composition is used as a lubricating oil, the incorporation ratio of the alkanolamine is set to from 0.1 to 10% by weight with respect to the entirety of the lubricant composition. In this range, specific peeling by hydrogen brittleness can be prevented. When the incorporation ratio goes beyond 10% by weight, the peeling generation lifetime cannot be extended because, for example, the reactivity with iron becomes too high and corrosion wearing occurs. The incorporation ratio is preferably from 0.3 to 10% by weight, more preferably from 0.3 to 5% by weight, further preferably from 2 to 5% by weight.

In the case when the above-mentioned lubricant composition is used as a grease, the incorporation ratio of the alkanolamine is set to 0.1 to 10 parts by weight with respect to 100 parts by weight of the total amount of the base oil and the thickener. In this range, specific peeling by hydrogen brittleness can be prevented. When the incorporation ratio goes beyond 10 parts by weight, the peeling generation lifetime cannot be extended because, for example, the reactivity with iron becomes too high and thus corrosion wearing occurs. The incorporation ratio is preferably from 0.3 to 10 parts by weight, more preferably from 0.3 to 5 parts by weight, further preferably from 2 to 5 parts by weight.

In the case when the above-mentioned lubricant composition is used as the lubricating oil, as the base oil for the lubricant composition, at least one oil selected from mineral oils, highly-purified mineral oils and water-soluble lubricating oils is used. Examples of the mineral oils include spindle oils, refrigerator oils, turbine oils, machine oils, dynamo oils and the like. Examples of the water-soluble lubricating oils include water-glycol-based operation oils and the like. The highly-purified mineral oils can be obtained by, for example, synthesizing by subjecting a slug wax obtained from a residual oil of distillation under a reduced pressure to catalytic hydrogenation thermal decomposition. In the highly-purified oils, the sulfur content ratio is preferably lower than 0.1% by weight, more preferably lower than 0.01% by weight. Furthermore, a GTL oil synthesized by the Fischer-Tropsch process is exemplified.

In the case when the above-mentioned lubricant composition is used as a grease, as the base oil for the lubricant composition, at least one oil selected from alkyl diphenyl ether oils, PAO and ester oils is used. These are excellent in heat resistance and lubrication property. These base oils may be used singly or in combination of two or more kinds.

Examples of the alkyl diphenyl ether oils include monoalkyl diphenyl ether oils represented by the following formula (2), dialkyl diphenyl ether oils represented by the following formula (3), or polyalkyl diphenyl ethers, and the like.

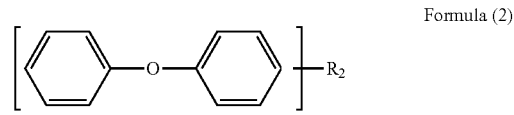

Formula (2)

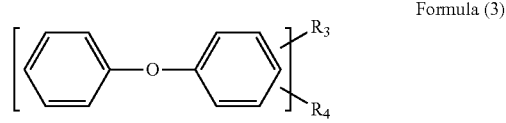

Formula (3)

$R_2$, $R_3$ and $R_4$ in the formulas are each an alkyl group having 8 to 20 carbon atoms, and are bonded to one phenyl ring, or are respectively bonded to two phenyl rings. Among these, dialkyl diphenyl ether oils having $R_3$ and $R_4$ are preferable with consideration for heat-resistance and the like.

The PAO (synthetic hydrocarbon oil) is generally a mixture of an α-olefin or an isomerized α-olefin with an oligomer or a polymer. Specific examples of the α-olefin include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, 1-tetradococene and the like, and mixtures thereof are generally used.

Examples of the ester oils include diester oils such as dibutyl sebacate, di-2-ethylhexyl sebacate, dioctyl adipate, diisodecyl adipate, ditridecyl adipate, ditridecyl glutalate and methyl acetyl cinnolate, aromatic ester oils such as trioctyltrimellitate, tridecyltrimellitate and tetraoctylpyromellitate, polyol ester oils such as trimethylolpropane caprylate, trimethylolpropane pelargonate, pentaerythritol-2-ethylhexanoate and pentaerythritol belargonate, carbonate ester oils, phosphate ester oils, polymer ester oils, polyglycol oils, and the like.

Figure 7:
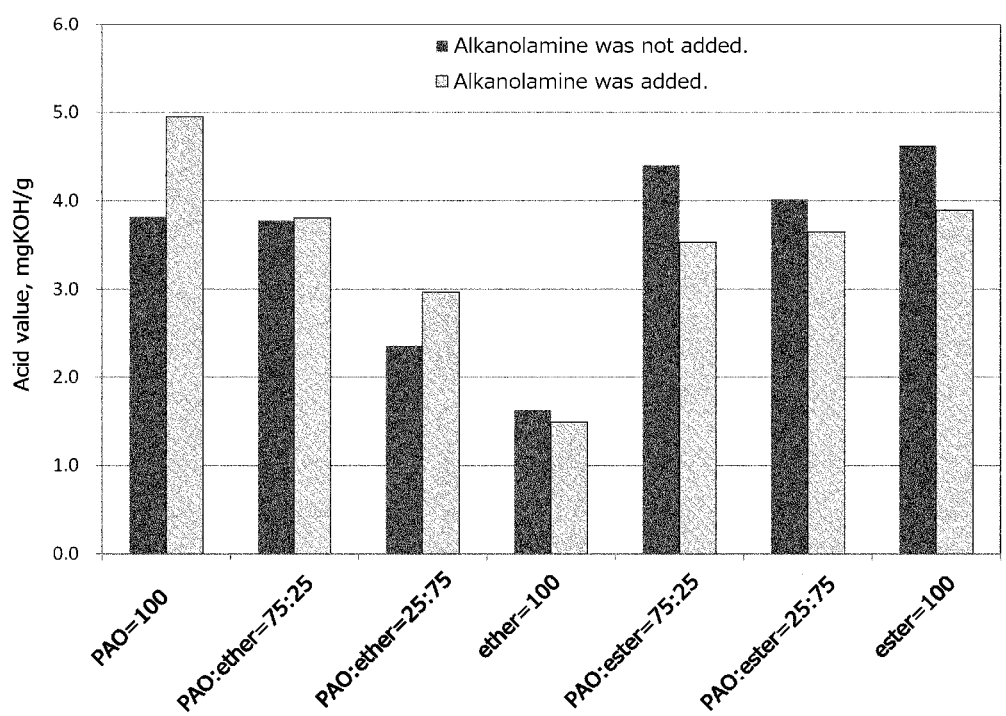
FIG. 7 is a drawing showing the result of the measurement of the acid value of the base oil.

In the case when the above-mentioned lubricant composition is used as a grease in rolling bearings for automobile electrical components and auxiliary machines, it is preferable to form (A) an oil containing, as an essential component, an alkyl diphenyl ether oil by 25% by weight or more with respect to the entirety of the base oil, or (B) an oil containing, as an essential component, an ester oil by 25% by weight or more with respect to the entirety of the base oil. The base oil may be a base oil formed of only an alkyl diphenyl ether oil, or a base oil formed of only an ester oil. As shown in FIG. 7, the alkyl diphenyl ether oil is excellent in acid value stability, and also excellent in high temperature durability. Furthermore, even in the case of a base oil containing an ester oil, the acid value can be decreased by using the base oil and alkanolamine in combination, and thus a rolling bearing having a sufficient high temperature durability for use in electrical components and auxiliary machines for automobiles can be produced. Furthermore, as long as the above-mentioned (A) and (B) are satisfied, other oils such as PAOs and mineral oils may be contained besides the alkyl diphenyl ether oil and ester oil. Specifically it is preferable to form a mixed oil containing a PAO in the above-mentioned (A) or (B).

The kinetic viscosity of the base oil (in the case of a mixed oil, the kinetic viscosity of the mixed oil) is preferably from 10 to 200 mm$^2$/s, more preferably from 10 to 100 mm$^2$/s, further preferably from 30 to 100 mm$^2$/s at 40° C.

In the case when the above-mentioned lubricant composition is used as a grease, a thickener is further incorporated. The thickener is not specifically limited, and a general thickener that is generally used in the field of greases can be used. For example, soap-based thickeners such as metal soaps and composite metal soaps, and non-soap-based thickeners such as benton, silica gel, urea compounds, urea-urethane compounds, and the like can be used. Examples of the metal soaps include sodium soaps, calcium soaps, aluminum soaps, lithium soaps and the like, and examples of the urea compounds and urea-urethane compounds include diurea compounds, triurea compounds, tetraurea compounds, other polyurea compounds, diurethane compounds and the like. Among these, it is preferable to use urea compounds, which are excellent in heat-resistant durability and also excellent in property to intervene to a sliding part and adhesiveness.

The urea compound can be obtained by reacting a polyisocyanate component and a monoamine component. Examples of the polyisocyanate component include phenylene diisocyanate, trylene diisocyanate, diphenyl diisocyanate, diphenylmethane diisocyanate, octadecane diisocyanate, decane diisocyanate, hexane diisocyanate and the like. Furthermore, as the monoamine component, aliphatic monoamines, alicyclic monoamines and aromatic monoamines can be used. Examples of the aliphatic monoamines include hexylamine, octylamine, dodecylamine, hexadecylamine, octadecylamine, stearylamine, oleylamine and the like. Examples of the alicyclic monoamines include cyclohexylamine and the like. Examples of the aromatic monoamines include aniline, p-toluidine and the like.

Among these urea compounds, it is preferable to use diurea compounds using an aromatic diisocyanate as a polyisocyanate component, such as aromatic diurea compounds using an aromatic monoamine as a monoamine component, aliphatic diurea compounds using an aliphatic monoamine, and alicyclic diurea compounds using an alicyclicmonoamine are preferable, since these are specifically excellent in heat-resistant durability. Specifically, in use in rotation of outer wheels such as pulleys, alicyclic diurea compounds are preferably used since they are excellent in oil feeding property.

A base grease is obtained by incorporating a thickener such as an urea compound in a base oil. The base grease containing an urea compound as a thickener is prepared by reacting the above-mentioned polyisocyanate component and monoamine component in a base oil. The incorporation ratio of the thickener in the base grease is from 1 to 40% by weight, preferably from 3 to 25% by weight. When the content of the thickener is lower than 1% by weight, the viscosity-increasing effect is decreased, and thus formation of a grease is difficult, whereas when the content goes beyond 40% by weight, the obtained base grease becomes too hard, and thus the desired effect is difficult to be obtained.

The method for preparing the grease may be either a method in which alkanolamine is firstly incorporated in a base oil, and a thickener is then prepared by using this base oil, or a method in which a grease is adjusted and a dispersion liquid is then added thereto. Since the alkanolamine contains an amino group, in the case when an urea compound is used as the thickener, a preferable method is such that the above-mentioned polyisocyanate component and monoamine component are reacted in a base oil to prepare a base grease, and alkanolamine is then added.

In the case of the above-mentioned grease, the worked penetration (JIS K 2220) is preferably in the range of 200 to 350. In the case when the penetration is lower than 200, oil separation is small, and thus the lubrication may be poor. On the other hand, when the penetration goes beyond 350, it is not preferable since the grease is soft and easily flows out of the bearing.

In the lubricant composition used in the rolling bearing of the present invention, the alkanolamine is present in its original form rather than a form of a reacted product such as a salt with an acid. Therefore, incorporation of an additive that forms a salt with alkanolamine such as an aliphatic acid is avoided. Where necessary, the above-mentioned lubricant composition may contain known additives to the extent that such purpose of the present invention is not deteriorated. Examples of the additives include antioxidants such as organic zinc compounds, amine-based and phenol-based compounds, metal inactivators such as benzotriazole, viscosity index improvers such as polymethacrylate and polystyrene, solid lubricants such as molybdenum disulfide and graphite, anticorrosives such as metal sulfonates and polyvalentalcohol esters, oil-based agents such as esters and alcohols, other antiwearing agents, and the like. These can be added singly, or by combining two or more kinds. Furthermore, in the present invention, even in the case of a constitution in which an organic molybdenum compound such as molybdenum dithiophosphate or molybdenum dithiocarbamate is not incorporated, the peeling on a rolling surface or the like due to hydrogen brittleness can be prevented.

In the case of the above-mentioned grease, it is preferable to contain at least one antioxidant selected from phenol-based antioxidants, amine-based antioxidants and zinc dithiophosphates. Among these, it is preferable to use a zinc dithiophosphate as an essential component, and use one of a phenol-based antioxidant and an amine-based antioxidant in combination. Specifically, it is preferable to use a zinc dithiophosphate and an amine-based antioxidant in combination. Furthermore, the incorporation ratio of these antioxidants is preferably 0.5 to 5 parts by weight in total with respect to 100 parts by weight of the total amount of the base oil and thickener.

As the zinc dithiophosphate (zinc dithiophosphate; hereinafter referred to as "ZnDTP"), dialkyl dithiozinc dithiophosphates and diaryl zinc dithiophosphates represented by the following formula (4), and the like are exemplified.

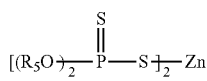
Formula (4)

$R_5$ in the formula represents a primary or secondary alkyl group having 1 to 24 carbon atom(s), or an aryl group having 6 to 30 carbon atoms. Examples of $R_5$ include a methyl group, an ethyl group, a propyl group, an isopropyl group, a butyl group, a secondary butyl group, an isobutyl group, a pentyl group, a 4-methylpentyl group, a hexyl group, a 2-ethylhexyl group, a heptyl group, an octyl group, a nonyl group, a decyl group, an isodecyl group, a dodecyl group, a tetradecyl group, a hexadecyl group, an octadecyl group, an eicosyl group, a docosyl group, a tetracosyl group, a cyclopentyl group, a cyclohexyl group, a methylcyclohexyl group, an ethylcyclohexyl group, a dimethylcyclohexyl group, a cycloheptyl group, a phenyl group, a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a dodecylphenyl group, a tetradecylphenyl group, a hexadecylphenyl group, an octadecylphenyl group, a benzyl group and the like. These respective $R_5$s may be the same or different.

Among these, $R_5$ is preferably a primary alkyl group since the zinc dithiophosphate has excellent stability and also contributes to prevention of peeling on a rolling surface due to hydrogen brittleness. Furthermore, in the case when $R_5$ is an alkyl group, the zinc dithiophosphate has more excellent heat-resistance and is dissolved in the base oil more easily at a larger number of carbon atoms. On the other hand, the zinc dithiophosphate has more excellent antiwearing property and becomes more difficult to be solved in a base oil at a smaller number of carbon atoms. Examples of preferable commercial products of ZnDTP include Adeka Kiku-Lube 2112 manufactured by ADEKA Corporation, and the like.

Furthermore, it is preferable for the above-mentioned lubricant composition not to contain a solid powder that does not dissolve in a base oil. "A solid powder that does not dissolve in a base oil" refers to, for example, a solid powder whose insoluble component is precipitated in the base oil when visually observed after 0.5% by weight of the solid powder with respect to the total weight after dissolution is added to a base oil and stirred, and the mixture is retained at 70° C. for 24 hours. When the insoluble component is precipitated, the base oil is not transparent, and the solid powder is put into a colloidal state or a suspension state, and this can be determined by visual observation. Examples of such solid powder include metal powders of aluminum, silicon, titanium, tungsten, molybdenum, chromium, cobalt, gold, silver, copper, yttrium, zirconium, iridium, palladium, platinum, rhodium, ruthenium, hafnium, tantalum, tungsten, rhenium, osmium and the like. The present invention can prevent peeling on a rolling surface or the like due to hydrogen brittleness by incorporating alkanolamine (a liquid or paste form) without incorporating these metal powders.

The rolling bearing of the present invention has a plurality of bearing elements formed of an iron-based metal and a lubricant composition for lubricating the metal contact surfaces of the respective bearing elements. The rolling bearing of the present invention will be explained based on FIG. 1. FIG. 1 is a cross-sectional view of a deep groove ball bearing. In the rolling bearing 1, an inner wheel 2 having an inner wheel rolling surface 2a on the outer periphery surface and an outer wheel 3 having an outer wheel rolling surface 3a on the inner periphery surface are concentrically disposed, and a plurality of rolling bodies 4 are disposed between the inner wheel rolling surface 2a and the outer wheel rolling surface 3a. These rolling bodies 4 are retained by a cage 5. Furthermore, openings 8a and 8b on the both ends in the axis direction of the inner and outer wheels are sealed by a seal element 6, and the above-mentioned lubricant composition 7 is enclosed in at least the peripheries of the rolling bodies 4. The inner wheel 2, outer wheel 3 and rolling bodies 4 are formed of high carbon-chromium bearing steel, which is an iron-based metal, and the lubricant composition 7, which is a grease, intervenes in the rolling surface with the rolling bodies 4, whereby lubrication is performed.

In the rolling bearing of the present invention, the iron-based metal material that constitutes the bearing element is an arbitrary material that is generally used as a bearing material, and examples thereof include the above-mentioned high carbon-chromium bearing steels (SUJ1, SUJ2, SUJ3, SUJ4, SUJ5 and the like; JIS G 4805), carburized steels (SCr420, SCM420 and the like; JIS G 4053), stainless steels (SUS440C and the like; JIS G 4303), high velocity steels (M50 and the like), cold-rolled steels and the like. Furthermore, the seal element 6 may be made of a metal or may be a rubber molded article alone, or a composite form of a rubber-molded article with a metal plate, a plastic plate or a ceramic plate. A composite form of a rubber-molded article with a metal plate is preferable in view of durability and easiness of fixing.

Although a ball bearing is exemplified as a bearing in FIG. 1, the rolling bearing of the present invention can be used as bearings other than that mentioned above such as a cylindrical roller bearing, a conical roller bearing, an automatic aligning roller bearing, a needle roller bearing, a thrust cylindrical roller bearing, a thrust conical roller bearing, a thrust needle roller bearing, a thrust automatic aligning roller bearing and the like.

Since the rolling bearing of the present invention encloses the above-mentioned lubricant composition, specific peeling of the bearing elements formed of the iron-based metal material on the rolling surface due to hydrogen brittleness can be prevented, and the bearing can have along lifetime even under severe conditions such as a high temperature, a high-speed and the like. Therefore, the rolling bearing can be preferably used as a bearing used by high-speed rotation at a high temperature for use in motors for electrical components and auxiliary machine for automobiles, industrial devices, and the like.

For example, the rolling bearing can be preferably used as rolling bearings of electrical components and auxiliary machines for automobiles such as alternators, compressors, electromagnetic clutches for automobile air conditioners, intermediate pulleys and electric fan motors; and rolling bearings of motors for industrial machines such as motors for exhaust fans, blower motors for fuel batteries, cleaner motors, fan motors, servo motors and stepping motors, motors for electrical component devices such as starter motors, electric power steering motors, tilt motors for adjusting steering, blower motors, wiper motors and power window motors of automobiles, driving motors for electric automobiles and hybrid automobiles; and the like.

Figure 2:
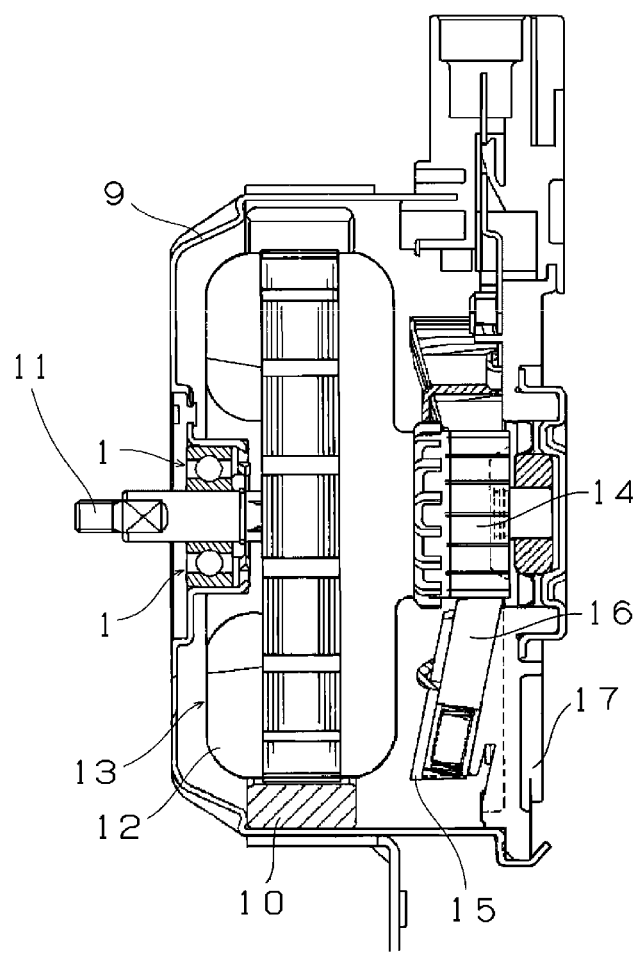
FIG. 2 is a cross-sectional view of a motor using the rolling bearing of the present invention.

An example of a motor to which the rolling bearing of the present invention is applied is shown in FIG. 2. FIG. 2 is a cross-sectional view of the structure of the motor. The motor includes a stator 10 composed of a magnet for motors disposed on an inner periphery wall of a jacket 9, a rotor 13 that is fixed on a rotation axis 11 and has a winding wire 12 that is wound around the rotor 13, a commutator 14 that is fixed on the rotation axis 11, a brush holder 15 that is disposed on an end frame 17 that is supported by the jacket 9, and a brush 16 that is housed in the brush holder 15. The above-mentioned rotation axis 11 is rotatably supported by the jacket 9 by the rolling bearing 1 and a support structure for the bearing 1. The bearing 1 is the rolling bearing of the present invention.

As the bearing for motors, besides the deep groove ball bearing shown in FIG. 1, an angular contact ball bearing, and the respective bearings listed above can also be used. Among these, it is preferable to use a deep groove ball bearing, which has a rotation accuracy under high-speed rotation, a loading resistance, and a low cost.

Furthermore, a rolling bearing having a lubricating oil composition enclosed therein can be preferably utilized as bearings for reducers for construction machines and for speed-up gears in wind-power generation.

Figure 3:
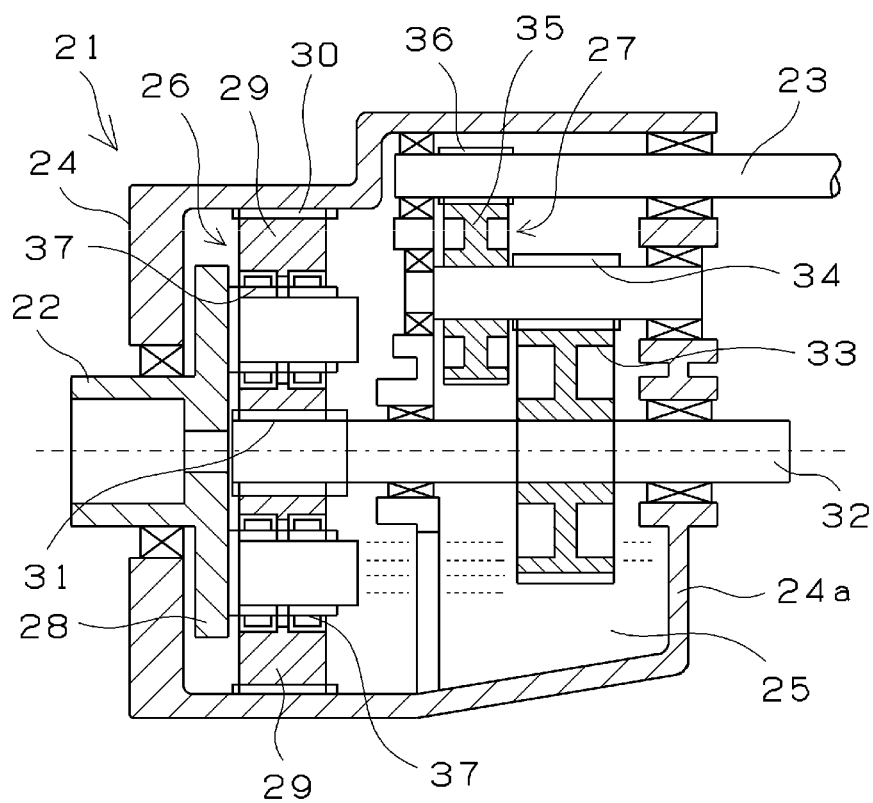
FIG. 3 is a cross-sectional view of a speed-up gear using the rolling bearing of the present invention.

An example of a speed-up gear for wind-power generation devices, to which the rolling bearing of the present invention is applied, is shown in FIG. 3. FIG. 3 is a cross-sectional view of the speed-up gear. The speed-up gear main body 21 includes an input axis 22 and an output axis 23, and a planetary gear mechanism 26 that serves as a primary speed-up gear and a secondary speed-up gear 27 disposed therebetween. In the planetary gear mechanism 26, a planetary gear 29 is disposed on a carrier 28 that is integrated with input axis 22, and the planetary gear 29 is engaged with an internally-toothed ring gear 30 and a sun gear 31, and an axis that is integrated with the sun gear 31 serves as an intermediate output axis 32. The secondary speed-up gear 27 is composed of an array of gears that transmit the rotation of the intermediate output axis 32 to the output axis 23 via a plurality of gears 33 to 36. The respective parts that serve as a rolling bearing 37 that is composed of the planetary gear 29 and a bearing steel that supports the planetary gear 29, the ring gear 30, and the gear 33 of the secondary speed-up gear 27 are immersed in a lubricating oil 25 of a lubricating oil storage bath 24a in a housing 24. This lubricating oil 25 is the above-mentioned lubricant composition. The lubricating oil storage bath 24a is circulated by a circulation oil feeding means composed of a pump and tubes (not illustrated). It is not essential to provide the circulation oil feeding means, and an oil bath lubrication system may also be used.

Also in such speed-up gear, specific peeling due to hydrogen brittleness which occurs on the rolling surfaces of the respective bearings and parts, and the like can be prevented for a long period, and thus the lifetime of the speed-up gear can be extended. As a result, the maintenance frequency of the wind-power generation device can be decreased.

Figure 4:
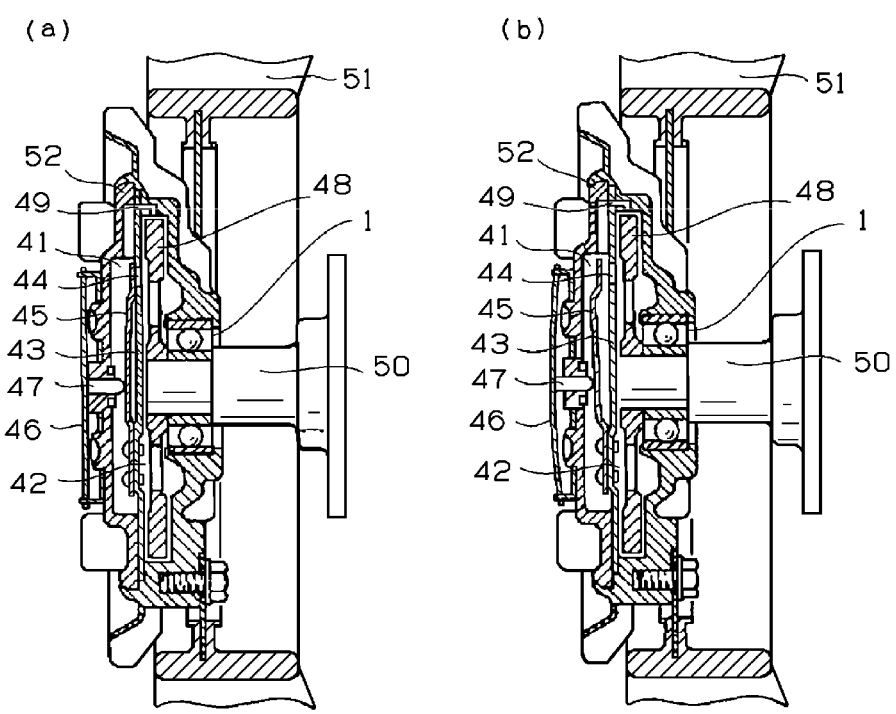
FIGS. 4(a) and 4(b) are cross-sectional views showing a fan coupling device using the rolling bearing of the present invention.

An example of the a fan coupling device to which the rolling bearing of the present invention is applied is shown in FIGS. 4 (a) and 4 (b). FIGS. 4 (a) and 4 (b) are cross-sectional views of the structure of the fan coupling device. In the fan coupling device, an oil chamber 41 in which a viscous fluid such as a silicone oil is filled and a stirring chamber 42 in which a drive disk 48 is incorporated are disposed in a case 52 that supports a cooling fan 51, a port 44 is formed on a divider plate 43 that is disposed between the two chambers 41 and 42, and an end part of a spring 45 that opens and closes the port 44 is fixed on the divider plate 43. The cooling fan 51 is rotatably supported by a rolling bearing 1 in which the above-mentioned grease is enclosed. Furthermore, a bimetal 46 is attached to the front surface of the case 52, and a piston 47 of the spring 45 is disposed on the bimetal 46. The bimetal 46 is put into a planular state in the case when the temperature of the air that has passed through a radiator is a preset temperature such as 60° C. or less, and the piston 47 pressurizes the spring 45, and the spring 45 closes the port 44. Furthermore, when the temperature of the above-mentioned air goes beyond the preset temperature, the bimetal 46 curves toward the outer direction as shown in FIG. 4 (b), the piston 47 releases the pressurization of the spring 45, and the spring 45 opens the port 44 by elastic deformation.

In the operation state of the fan coupling device having the above-mentioned constitution, in the case when the temperature of the air that has passed through the radiator is lower than the preset temperature of the bimetal 46, since the port 44 is closed by the spring 45 as shown in FIG. 4 (a), the viscous fluid in the oil chamber 41 does not flow into the stirring chamber 42, and the viscous fluid in the stirring chamber 42 is sent from a circulation hole 49 disposed on the divider plate 43 into the chamber 41 by the rotation of the drive disk 48. Therefore, the amount of the viscous fluid in the stirring chamber 42 becomes little, and the shear resistance by the rotation of the drive disk 48 decreases, and thus the transmission torque on the case 52 decreases, and the cooling fan 51, which is supported by the rolling bearing 1, rotates at a low speed. When the temperature of the air that has passed through the radiator goes beyond the preset temperature of the bimetal 46, the bimetal 46 curves toward the outer direction as shown in FIG. 4 (b), and the piston 47 releases the pressurization of the spring 45. At this time, the spring 45 is elastically deformed in the direction apart from the divider plate 43, and thus the port 44 is opened, and the viscous fluid in the oil chamber 41 flows from the port 44 into the stirring chamber 42. Therefore, the shear resistance of the viscous fluid by the rotation of the drive disk 48 increases, the rotation torque on the case 52 increases, and the cooling fan 51, which is supported by the rolling bearing 1, rotates at a high speed.

As mentioned above, since the rotation velocity of the cooling fan 51 changes in accordance with the change of the temperature in the fan coupling device, warm-up is accelerated, and the supercooling of cooling water is prevented, and thus an engine can be effectively cooled. The cooling fan 51 is substantially separated from the drive axis 50 when an engine temperature is low, whereas the cooling fan 51 is substantially connected to the drive axis 50 in the case of a high temperature. Accordingly, the rolling bearing 1 is used in a broad temperature range from low temperatures to high temperatures, and under a rapid acceleration and deceleration condition in which the rotation number significantly varies depending on temperature change.

Figure 5:
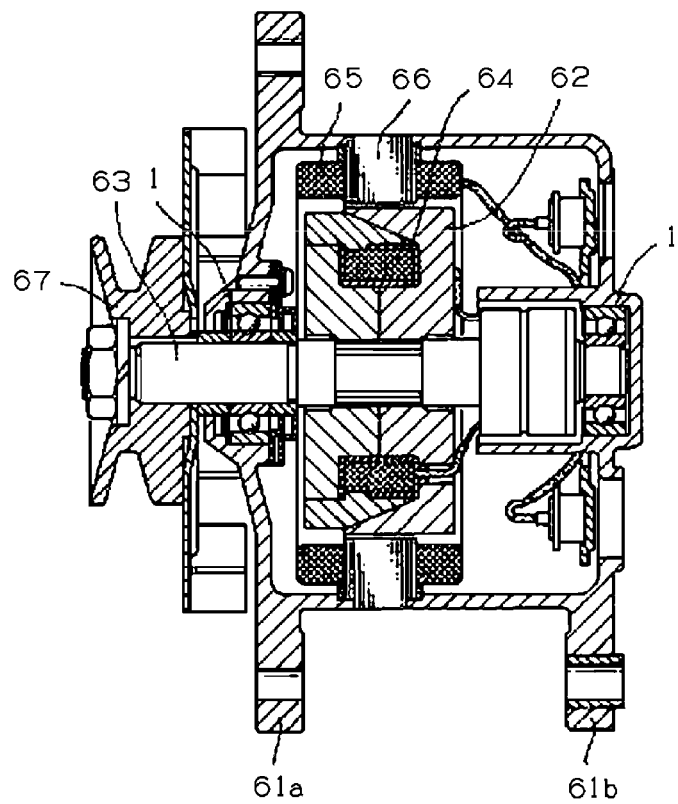
FIG. 5 is a cross-sectional view showing an alternator using the rolling bearing of the present invention.

An example of an alternator to which the rolling bearing of the present invention is applied is shown in FIG. 5. FIG. 5 is a cross-sectional view of the structure of the alternator. The alternator includes a pair of frames 61a and 61b that form a housing, which is a static element, and a rotor rotation axis 63 to which a rotor 62 is attached. The rotor rotation axis 63 is rotatably supported by a pair of rolling bearings 1 and 1 in which the above-mentioned grease is enclosed. A rotor coil 64 is attached to the rotor 62, and three stator coils 66 are attached at a phase of 120° to a stator 65 that is disposed on the outer periphery of the rotor 62. The rotor rotation axis 63 is driven by rotation by a rotation torque that is transmitted by a belt (illustration is omitted) to a pulley 67 that is attached to the tip of the rotor rotation axis 63. The pulley 67 is attached to the rotor rotation axis 63 in a cantilevered state, and oscillation is also generated in accordance with the high-speed rotation of the rotor rotation axis 63. Therefore, the rolling bearing 1 that supports the side of the pulley 67 is subject to a severely high load.

Figure 6:
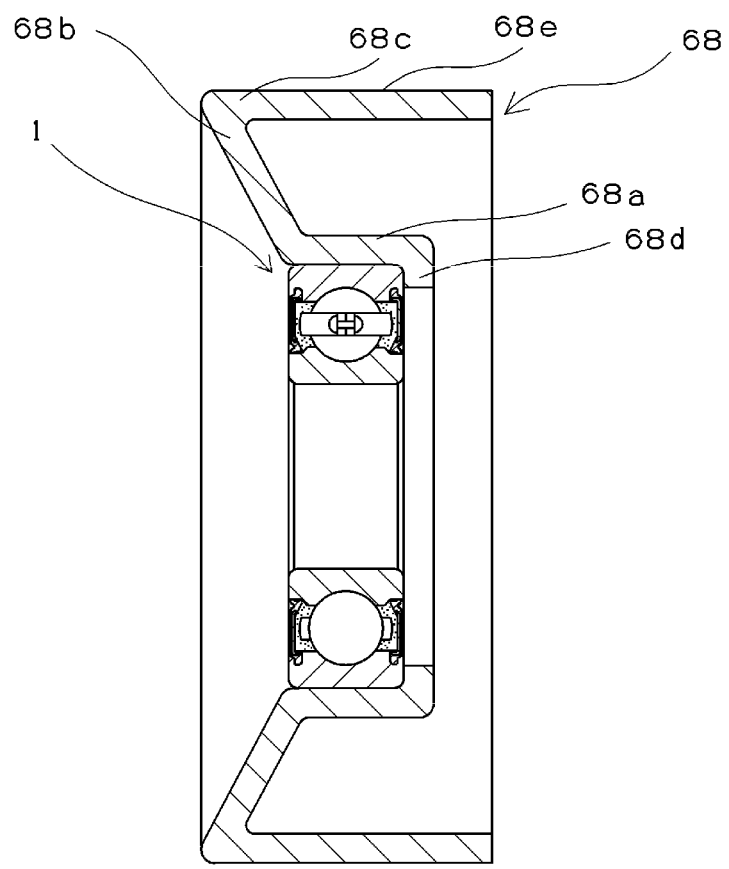
FIG. 6 is a cross-sectional view showing an idler pulley using the rolling bearing of the present invention.

An example of an idler pulley to which the rolling bearing of the present invention is applied is shown in FIG. 6. The idler pulley is used as a belt tensioner for an auxiliary machine driving belt for automobiles. FIG. 6 is a cross-sectional view of the structure of the idler pulley. This pulley is constituted by a pulley main body 68 made of a steel plate press, and a rolling bearing 1 (see FIG. 1) of a single array which is fit to the inner diameter of the pulley main body 68. The pulley main body 68 is a ring body that is constituted by an inner diameter cylindrical part 68a, a flange part 68b that extends from one end of the inner diameter cylindrical part 68a to the side of the outer diameter, an outer diameter cylindrical part 68c that extends from the flange part 68b to the axis direction, and a flange part 68d that extends from another end of the inner diameter cylindrical part 68a to the side of the inner diameter. The outer wheel 3 of the rolling bearing 1 shown in FIG. 1 is fit to the inner diameter of the inner diameter cylindrical part 68a, and a pulley circumferential surface 68e that is brought into contact with a belt that is driven by an engine is disposed on the outer diameter of the outer diameter cylindrical part 68c. By bringing the pulley circumferential surface 68e into contact with the belt, the pulley plays a role as an idler.

EXAMPLES

The present invention will be more specifically explained with reference to Examples and Comparative Examples, but is not limited to these examples at all.

Examples A-1 to A-7 and Comparative Examples A-1 to A-6

4,4'-Diphenylmethanediisocyanate (Millionate MT manufactured by Nippon Polyurethane Industry Co., Ltd., hereinafter referred to as "MDI") was dissolved at the rate shown in Table 1 in a half amount of the base oil shown in the table, and a monoamine in a double equivalent amount of the MDI was dissolved in the residual half amount of the base oil. The respective incorporation ratios and kinds are as shown in the table. The solution in which the monoamine was dissolved was added to the solution in which the MDI was dissolved under stirring, and the monoamine and MDI were reacted by continuing the stirring for 30 minutes at 100 to 120° C., whereby a diurea compound was generated in the base oil to give a base grease. The respective additives were added thereto at the incorporation ratio shown in Table 1, and the stirring was further sufficiently performed. The product was then homogenized by a triple roll to give a sample grease. The following 1) to 9) in Table 1 are the same also in Table 2.

The obtained grease was enclosed in a rolling bearing, and a rapid acceleration and deceleration test 1 shown below was performed. The test method and test condition will be shown below. Furthermore, the results are shown in Table 1.

<Rapid Acceleration and Deceleration Test 1>

The above-mentioned grease was enclosed in a rolling bearing (the inner wheel, outer wheel and steel ball were made of bearing steel SUJ2) of inner wheel rotation, which supports a rotation axis, by simulating an alternator, which is an example of an electrical component auxiliary machine, and a rapid acceleration and deceleration test was performed. For the conditions of the rapid acceleration and deceleration test, the operation conditions were preset to under an atmosphere of 120° C., a loading on a pulley attached to the tip of the rotation axis of 1,960 N, and a rotation velocity of 0 rpm to 18,000 rpm, and the test was performed under a state in which an electrical current of 0.5 A is flown in a test bearing (6203). Furthermore, the time at which abnormal peeling was generated in the bearing, and the oscillation of an oscillation detector became a preset value or more and the bearing stopped (peeling generation lifetime, h) was measured.

TABLE 1

|  | Examples | | | | | | | Comparative Examples | | | | | |
| --- | --- | --- | --- | --- | --- | --- | --- | --- | --- | --- | --- | --- | --- |
|  | A-1 | A-2 | A-3 | A-4 | A-5 | A-6 | A-7 | A-1 | A-2 | A-3 | A-4 | A-5 | A-6 |
| Base oil (parts by weight) | | | | | | | | | | | | | |
| PAO[1] | 66 | 66 | 66 | 66 | 66 | 15 | 63 | 66 | 66 | 66 | 66 | 15 | 63 |
| Ester oil[2] | 22 | 22 | 22 | 22 | 22 | — | — | 22 | 22 | 22 | 22 | — | — |
| Alkyl diphenyl ether[3] | — | — | — | — | — | 63 | 15 | — | — | — | — | 63 | 15 |
| Thickener (parts by weight) | | | | | | | | | | | | | |
| Amine: p-toluidine | — | — | — | — | — | 10.2 | 10.2 | — | — | — | — | 10.1 | 10.1 |
| Amine: octylamine | 6.1 | 6.1 | 6.1 | 6.1 | — | — | — | 6.1 | 6.1 | 6.1 | — | — | — |
| Amine: cyclohexylamine | — | — | — | — | 5.3 | — | — | — | — | — | 5.3 | — | — |
| Isocyanate: 4,4-diphenylmethanediisocyanate[4] | 5.9 | 5.9 | 5.9 | 5.9 | 6.7 | 11.8 | 11.8 | 5.9 | 5.9 | 5.9 | 6.7 | 11.9 | 11.9 |
| Additives (parts by weight) | | | | | | | | | | | | | |
| Antioxidant[5] | 1 | 1 | 1 | — | 1 | 1 | 1 | 1 | — | 1 | 1 | 1 | 1 |
| Antioxidant[6] | — | — | — | 1 | — | — | — | — | 1 | — | — | — | — |
| Diol[7] | — | — | — | — | — | — | — | — | — | 2 | — | — | — |
| Diethanolamine[8] | 0.1 | 2 | 10 | 2 | 2 | 2 | 2 | — | — | — | — | — | — |
| ZnDTP[9] | 2 | 2 | 2 | 2 | 2 | 2 | 2 | 2 | 2 | 2 | 2 | 2 | 2 |
| Peeling generation lifetime, h | 69 | 86 | 72 | 79 | 88 | 83 | 80 | 20 | 23 | 27 | 25 | 30 | 30 |

[1]Kinetic viscosity at 40° C.: 30 mm$^2$/s (Shinfluid 601 manufactured by Nippon Steel & Sumitomo Chemical Co., Ltd.)
[2]Kinetic viscosity at 40° C.: 72 mmVs (H2362 manufactured by HATCO Corporation)
[3]Kinetic viscosity at 40° C.: 97 mm$^2$/s (Moresco HILUBE LB100 manufactured by Matsumura Oil Co., Ltd.)
[4]Millionate MT manufactured by Nippon Polyurethane Industry Co., Ltd.
[5]Alkylated diphenylamine
[6]Phenol-based BHT
[7]ADEKA ECOROYAL FMD-410 manufactured by ADEKA Corporation
[8]ADEKA KIKU-LUBE FM-812 manufactured by ADEKA Corporation
[9]ADEKA KIKU-LUBE Z112 manufactured by ADEKA Corporation As shown in Table 1, in the respective Examples in which alkanolamine (diethanolamine) was incorporated, the peeling generation lifetime was significantly extended as compared to the respective Comparative Examples. The reason therefor is considered that the specific peeling associated with white tissue change due to the hydrogen brittleness generated on the rolling surface was effectively prevented. On the other hand, as shown in Comparative Example A-3, the effect of extending the peeling generation lifetime was not obtained by the diol.

Example A-8 to Example A-11, Comparative Example A-7 to Comparative Example A-9

A lifetime test was performed by lubricating needle roller bearings (inner wheel outer diameter: 24 mm in diameter, outer wheel inner diameter: 32 mm in diameter, width: 20 mm, roller diameter 4×16.8 mm×14 pieces) by using a lubricating oil having the composition shown in Table 2. In the lifetime test, the bearings were rotated by rapid acceleration and deceleration in which rotation numbers of 3,000 rpm, 500 rpm, 3,000 rpm and 500 rpm are sequentially repeated at a radial load of 6.76 kN at an atmospheric temperature of 100° C., and the time when peeling generated on the rolling surface (peeling generation lifetime time, h) was measured. The results are shown in Table 2.

TABLE 2

|  | Examples | | | | Comparative Examples | | |
| --- | --- | --- | --- | --- | --- | --- | --- |
|  | A-8 | A-9 | A-10 | A-11 | A-7 | A-8 | A-9 |
| Base oil (wt %) | | | | | | | |
| Water-glycol-based hydraulic oil[10] | 98 | 99.9 | 90 | — | 100 | 98 | — |
| Mineral oil[11] | — | — | — | 87 | — | — | 90 |
| Water | — | — | — | 10 | — | — | 10 |
| Additives (wt %) | | | | | | | |
| Diol[7] | — | — | — | — | — | 2 | — |
| Diethanolamine[8] | 2 | 0.1 | 10 | 3 | — | — | — |
| Peeling generation lifetime, h | 211 | 137 | 109 | >300 | 13 | 27 | 84 |

[10] In the water-glycol, water:glycol = 40:60, and the kinetic viscosity at 40° C. was 32 mm²/s.
[11] The mineral oil was a paraffin-based mineral oil, and the kinetic viscosity at 40° C. was 30.7 mm²/s.

As shown in Table 2, in the Examples in which alkanolamine (diethanolamine) was incorporated, the peeling generation lifetime was extended more significantly than that of Comparative Example A-7 in which only a water-glycol-based hydraulic oil was used. Furthermore, in Example A-11, in which alkanolamine (diethanolamine) was incorporated in a lubricating oil composed of a mineral oil and water, the peeling generation lifetime was extended more significantly than that of Comparative Example A-9, which is the same lubricating oil but this alkanolamine is not incorporated.

[Evaluation of Acid Value]

The effect of decreasing an acid value by a combination of an dialkanolamine and a base oil was evaluated. Table 3 shows the evaluated combinations (Reference Examples 1 to 14). For the combinations in which alkanolamine was added, the alkanolamine was 2 parts by weight with respect to 100 parts by weight of the base oil. Any of the added alkanolamine was diethanolamine (ADEKA KIKU-LUBE FM-812 manufactured by ADEKA Corporation). Furthermore, the PAO was Shinfluid 801 manufactured by Nippon Steel & Sumitomo Chemical Co., Ltd., the ester oil was H2362 manufactured by HATCO Corporation, and the alkyl diphenyl ether oil was Moresco HILUBE LB100 manufactured by Matsumura Oil Co., Ltd.

10 g of the base oil shown in Table 3 was collected in a 30 mL beaker (2 g of an iron powder had been put therein in advance), and left at 150° C. for 260 hours, and the acid value (mgKOH/g) at that time was measured by a neutralization titration method. The results are shown in Table 3 and FIG. 7.

TABLE 3

| Reference Example | Formulation (wt %) | | | Addition of alkanol amine | Acid value mgKOH/g | Label of FIG. 5 |
| --- | --- | --- | --- | --- | --- | --- |
|  | PAO | Alkyl diphenyl ether oil | Ester oil | | | |
| 1 | 100 | — | — | Not added | 3.82 | PAO = 100 |
| 2 | 75 | 25 | — | Not added | 3.78 | PAO:ether = 75:25 |
| 3 | 25 | 75 | — | Not added | 2.36 | PAO:ether = 25:75 |
| 4 | — | 100 | — | Not added | 1.62 | ether = 100 |
| 5 | 75 | — | 25 | Not added | 4.40 | PAO:ester = 75:25 |
| 6 | 25 | — | 75 | Not added | 4.02 | PAO:ester = 25:75 |
| 7 | — | — | 100 | Not added | 4.62 | ester = 100 |
| 8 | 100 | — | — | Added | 4.95 | PAO = 100 |
| 9 | 75 | 25 | — | Added | 3.81 | PAO:ether = 75:25 |
| 10 | 25 | 75 | — | Added | 2.97 | PAO:ether = 25:75 |
| 11 | — | 100 | — | Added | 1.49 | ether = 100 |
| 12 | 75 | — | 25 | Added | 3.53 | PAO:ester = 75:25 |
| 13 | 25 | — | 75 | Added | 3.65 | PAO:ester = 25:75 |
| 14 | — | — | 100 | Added | 3.90 | ester = 100 |

As shown in Table 3 and FIG. 7, in Reference Example 8 in which alkanolamine was added to the PAO, the acid value increased compared to that in Reference Example 1 in which the PAO oil was used singly. Furthermore, in the reference examples containing an ester oil, the acid value was decreased by adding the alkanolamine.

Example B-1 to Example B-7, Comparative Example B-1 to Comparative Example B-7

Firstly, a base oil was adjusted singly or by mixing by the formulation shown in Table 4. Secondly, MDI was dissolved in a half amount of the base oil, and cyclohexylamine in a double equivalent amount of MDI was dissolved in the residual half amount of the base oil. The solution in which cyclohexylamine had been dissolved was added to the solution in which the MDI had been dissolved under stirring, and the cyclohexylamine and MDI was reacted by continuing the stirring for 30 minutes at 100 to 120° C., whereby an alicyclic diurea compound was generated in the base oil to give a base grease. The incorporation ratio of the respective components constituting the thickener was adjusted so that the generated alicyclic diurea compound had the weight ratio of Table 4 with respect to the entirety of the grease. Alkanolamine was added thereto by the incorporation ratio shown in Table 4, and the mixture was further sufficiently stirred. The product was then homogenized by a triple roll to give a sample grease.

The obtained grease was enclosed in a rolling bearing, and a rapid acceleration and deceleration test 2 shown below was conducted. The test method and test condition are shown below.

<Rapid Acceleration and Deceleration Test 2>

The above-mentioned grease was enclosed in a rolling bearing (the inner wheel, outer wheel and steel ball were made of bearing steel SUJ2) of inner wheel rotation, which supports a rotation axis, by simulating an alternator, which is an example of an electrical equipment component auxiliary machine, and a rapid acceleration and deceleration test was performed. For the conditions of the rapid acceleration and deceleration test, the conditions were preset to under an atmosphere of 120° C., a loading on the pulley attached to the tip of the rotation axis of 1,960 N, and a rotation velocity of from 0 rpm to 18,000 rpm, 1% by weight of iron powder was incorporated in the grease so as to promote the exposure of a newly-generated surface by abrasion, and the test was performed under a state in which an electrical current of 1.0 A was flown in a test bearing (6203). Furthermore, the time at which abnormal peeling was generated in the bearing, and the oscillation of an oscillation detector became a preset value or more and the bearing stopped (peeling generation lifetime, h) was measured. The case when the peeling generation lifetime was 20 hours or more was judged as "peeling test: ○" and the case when the peeling generation lifetime was lower than 20 hours was judged as "peeling test: x", and these cases are shown in Table 4.

Furthermore, with respect to the base oils used in the respective Examples and Comparative Examples, with reference to the Reference Examples in Table 3, the case when the acid value after 260 hours had passed was 4.00 mgKOH/g or less was judged as "high temperature durability test: ○, and the case when the acid value exceeded 4.00 mgKOH/g was judged as "high temperature durability test: x", and these cases are shown in Table 4. In addition, for the examples to which alkanolamine was added in Table 4, the "added" of the addition of the alkanolamine in the above-mentioned Reference Examples was referred to, whereas for the examples to which alkanolamine was added, the "not added" of the addition of alkanolamine in the above-mentioned Reference Examples was referred to.

As shown in Table 4, in the respective Examples in which alkanolamine (diethanolamine) was incorporated, the peeling generation lifetime was extended more than those of the respective Comparative Examples. The reason therefor is considered that the specific peeling associated with white tissue change by the hydrogen brittleness generated on the rolling surface can be effectively prevented. On the other hand, Comparative Examples B1 to B7 in which alkanolamine was not incorporated, the results were poor in peeling resistance.

Example C-1 to Example C-3, and Comparative Example C-1 to Comparative Example C-2

MDI was dissolved at the ratio shown in Table 5 in a half amount of the base oil, and a monoamine in a double equivalent amount of the MDI was dissolved in the residual half amount of the base oil. The respective incorporation ratios and kinds are as shown in the table. The solution in which the monoamine had been dissolved was added to the solution in which the MDI had been dissolved under stirring, and the monoamine and MDI reacted by continuing the stirring for 30 minutes at 100 to 120° C., whereby a diurea compound was generated in the base oil to obtain a base grease. The respective additives were added thereto by the incorporation ratio shown in Table 5 and further stirred sufficiently. The product was then homogenized by a triple roll to obtain a sample grease.

The obtained grease was enclosed in a rolling bearing, and a rapid acceleration and deceleration test 3, a high temperature durability test and a rust test shown below were performed. The test method and test conditions are shown below.

<Rapid Acceleration and Deceleration Test 3>

The above-mentioned grease was enclosed in a rolling bearing (the inner wheel, outer wheel and steel ball were made of bearing steel SUJ2, Model No. 6203LLU (with a seal)) of inner wheel rotation, which supports a rotation axis, by simulating an alternator which is an example of an electrical component auxiliary machine, and a rapid acceleration and deceleration test was performed. For the conditions of the rapid acceleration and deceleration test, the conditions were preset under a room temperature atmo-

TABLE 4

|  | Examples | | | | | | | Comparative Examples | | | | | | |
| --- | --- | --- | --- | --- | --- | --- | --- | --- | --- | --- | --- | --- | --- | --- |
|  | B-1 | B-2 | B-3 | B-4 | B-5 | B-6 | B-7 | B-1 | B-2 | B-3 | B-4 | B-5 | B-6 | B-7 |
| Formulation of base oil (wt %) | | | | | | | | | | | | | | |
| Alkyl diphenyl ether[1)] | 25 | 75 | 100 | — | — | — | — | — | 25 | 75 | 100 | — | — | — |
| Ester oil[2)] | — | — | — | 25 | 75 | 100 | — | — | — | — | — | 25 | 75 | 100 |
| PAO[3)] | 75 | 25 | — | 75 | 25 | — | 100 | 100 | 75 | 25 | — | 75 | 25 | — |
| Formulation of grease composition (wt %) | | | | | | | | | | | | | | |
| Base oil (the formulation is shown in the upper column) | 80 | 80 | 80 | 80 | 80 | 80 | 80 | 80 | 80 | 80 | 80 | 80 | 80 | 80 |
| Thickener: alicyclic diurea | 19 | 19 | 19 | 19 | 19 | 19 | 19 | 20 | 20 | 20 | 20 | 20 | 20 | 20 |
| Additive: diethanolamine[4)] | 1 | 1 | 1 | 1 | 1 | 1 | 1 | — | — | — | — | — | — | — |
| Characteristics | | | | | | | | | | | | | | |
| High temperature durability test | ○ | ○ | ○ | ○ | ○ | ○ | x | ○ | ○ | ○ | ○ | x | x | x |
| Peeling test | ○ | ○ | ○ | ○ | ○ | ○ | ○ | x | x | x | x | x | x | x |

[1)]Kinetic viscosity at 40° C.: 97 mm$^2$/s (Moresco Hilube LB100 manufactured by Matsumura Oil Co., Ltd.)
[2)]Kinetic viscosity at 40° C.: 72 mm$^2$/s (H2362 manufactured by HATCO)
[3)]Kinetic viscosity at 40° C.: 47 mm$^2$/s (Shinfluid 801 manufactured by Nippon Steel & Sumitomo Chemical Co., Ltd.)
[4)]Adeka Kiku-Lube FM-812 manufactured by ADEKA Corporation sphere (25° C.), a loading on the pulley attached to the tip of the rotation axis of 1,960 N, and a rotation velocity of 0 rpm to 20,000 rpm, and the test was performed under a state in which an electrical current of 0.5 A flows in a test bearing. Furthermore, the time at which abnormal peeling was generated in the bearing, and the oscillation of an oscillation detector became a preset value or more and the bearing stopped (peeling generation lifetime, h) was measured. The results are shown in Table 5.

<High Temperature Durability Test>

The above-mentioned grease was enclosed in a rolling bearing (inner diameter of 20 mm×outer diameter of 47 mm×thickness of 14 mm, Model No. 6204ZZ (with a seal)), and the rolling bearing was rotated under an axial load of 67 N and a radial load of 67 N at a bearing temperature of 150° C. and a rotation velocity of 10,000 rpm, and the time to reach burn-in (high temperature durability lifetime, h) was measured. The result is shown in Table 5. The result is an average value of three tests (time, h).

<Rust Test>

A rust test was performed in accordance with the rust test method defined in ASTM D 1743, under severer test conditions against generation of rust. 2.0 g of the obtained grease was enclosed in a conical roller bearing 30204, which was degreased with an organic solvent in advance and dried, and the bearing was subjected to a pre-conditioning operation by applying an axial load of 98 N at 1,800 rotations per minutes for 1 minute. Secondly, the bearing was immersed in 1% by weight of brine, and the bearing was put into a sealable high humidity container that had reached a saturated water vapor pressure at 40° C., and left at 40° C. for 48 hours, and the situation of generation of rust was investigated. The situation of generation of rust was obtained by dividing the outer wheel race into 32 equal regions, the numbers of the regions in which rust was present was counted, and the probability of generation of rust was measured. The result is shown in Table 5. The number of the tests was four (the total number of the regions was 128).

TABLE 5

|  | Examples | | | Comparative Examples | |
| --- | --- | --- | --- | --- | --- |
|  | C-1 | C-2 | C-3 | C-1 | C-2 |
| Formulation of base grease (wt %) | 57 | 57 | 57 | 57 | 57 |
| Base oil PAO[1] |  |  |  |  |  |
| Ester oil[2] | 31 | 31 | 31 | 31 | 31 |
| Thickener | 1.3 | 1.3 | 1.3 | 1.3 | 1.3 |
| Amine: p-toluidine |  |  |  |  |  |
| Amine: octylamine | 4.7 | 4.7 | 4.7 | 4.7 | 4.7 |
| Isocyanate: 4,4-diphenyl-methanediisocyanate[3] | 6.0 | 6.0 | 6.0 | 6.0 | 6.0 |
| Formulation of grease composition (wt %) | 99 | 97 | 95 | 100 | 90 |
| Base grease (the formulation is shown in the upper column) |  |  |  |  |  |
| Additive: diethanol amine[4] | 1 | 3 | 5 | 0 | 10 |
| Characteristics Peeling generation lifetime, h | 23.4 | 24.4 | 26.2 | 21.8 | 26.3 |
| Probability of generation of rust | 48/128 | 42/128 | 49/128 | 119/128 | 18/128 |
| High temperature durability lifetime, h | 791 | 809 | 1246 | 770 | 368 |

[1]Kinetic viscosity at 40° C.: 30 mm$^2$/s (Shinfluid 601 manufactured by Nippon Steel & Sumitomo Chemical Co., Ltd.)
[2]Kinetic viscosity at 40° C.: 12 mm$^2$/s (Reolube DOS manufactured by Ciba Specialty Chemicals Inc.)
[3]Millionate MT manufactured by Nippon Polyurethane Industry Co., Ltd.
[4]ADEKA KIKU-LUBE FM-812 manufactured by ADEKA Corporation As shown in Table 5, generation of rust was prevented by incorporating alkanolamine (diethanolamine). Specifically, generation of rust was prevented while maintaining the peeling prevention property and high temperature durability by incorporating a predetermined amount of an alkanolamine.

INDUSTRIAL APPLICABILITY

The rolling bearing of the present invention can prevent specific peeling associated with white tissue change due to hydrogen brittleness, which generates on a rolling surface, and thus can be preferably utilized as rolling bearings used for electrical components and auxiliary machines for automobiles such as alternators, electromagnetic clutches for automobile air conditioners, fan coupling devices, intermediate pulleys and electric fan motors; rolling bearings used for motors for industrial machines and for driving electric automobiles; rolling bearings used for machine tools; and bearings used for speed-up gears for wind-power generation devices and used in reducers for construction machines.

EXPLANATION OF REFERENCE SYMBOLS AND NUMERALS

1 Rolling bearing
2 Inner wheel
3 Outer wheel
4 Rolling body
5 Cage
6 Seal element
7 Lubricant composition
8a, 8b Opening
9 Jacket
10 Stator
11 Rotation axis
12 Winding
13 Rotor
14 Commutator
15 Brush holder
16 Brush
17 End frame
21 Speed-up gear main body
22 Input axis
23 Output axis
24 Housing
25 Lubricating oil
26 Planetary gear mechanism
27 Secondary speed-up gear
28 Carrier
29 Planetary gear
30 Ring gear
31 Sun gear 32 Intermediate output axis
33 to 36 Gear
37 Rolling bearing
41 Oil chamber
42 Stirring chamber
43 Divider plate
44 Port
45 Spring
46 Bimetal
47 Piston
48 Drive disk
49 Circulation hole
50 Drive axis
51 Cooling fan
52 Case
61a, 61b Frame
62 Rotor
63 Rotor rotation axis
64 Rotor coil
65 Stator
66 Stator coil
67 Pulley
68 Pulley main body

The invention claimed is:

1. A rolling bearing comprising a plurality of bearing elements formed of an iron-based metal, and a lubricant composition that lubricates metal contact surfaces of the respective bearing elements,
wherein the lubricant composition is a grease consisting of a base oil, diethanolamine,
a thickener,
a zinc dithiophosphate, and
an amine-based antioxidant,
wherein the grease is free of alkali metal salts and alkaline earth metal salts of inorganic acids,
wherein the base oil is (A) an oil containing an alkyl diphenyl ether by 25% by weight or more with respect to the entirety of the base oil, or (B) an oil containing an ester oil by 25% by weight or more with respect to the entirety of the base oil,
wherein the thickener contains at least one urea compound selected from aliphatic diurea compounds, alicyclic diurea compounds, and
wherein diethanolamine is contained by 0.1 to 10 parts by weight with respect to 100 parts by weight of the total amount of the base oil and the thickener.

2. The rolling bearing according to claim 1, wherein the rolling bearing is a bearing for an electrical component/an auxiliary machine for automobiles, which rotatably supports a rotation axis that is rotated and driven by output of an engine on a static element.

3. The rolling bearing according to claim 2, wherein the base oil contains a poly-α-olefin oil.

4. The rolling bearing according to claim 2, wherein the thickener is an alicyclic diurea compound.

* * * * *